(12) United States Patent
Ogishima

(10) Patent No.: US 11,728,681 B2
(45) Date of Patent: Aug. 15, 2023

(54) CART POWER SUPPLY DEVICE

(71) Applicant: TOSHIBA TEC KABUSHIKI KAISHA, Tokyo (JP)

(72) Inventor: Takuya Ogishima, Izu Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 239 days.

(21) Appl. No.: 16/952,685

(22) Filed: Nov. 19, 2020

(65) Prior Publication Data

US 2021/0218280 A1    Jul. 15, 2021

(30) Foreign Application Priority Data

Jan. 9, 2020  (JP) ................. 2020-002103

(51) Int. Cl.
    *H02J 50/12*     (2016.01)
    *H02J 7/00*      (2006.01)
    *B60L 53/38*     (2019.01)
    *H02J 50/00*     (2016.01)
    *H02J 50/80*     (2016.01)
    *H02J 7/04*      (2006.01)

(52) U.S. Cl.
    CPC ............. *H02J 50/12* (2016.02); *B60L 53/38* (2019.02); *H02J 7/00714* (2020.01); *H02J 50/005* (2020.01); *H02J 7/04* (2013.01); *H02J 50/80* (2016.02)

(58) Field of Classification Search
    CPC .......... B62B 3/00; B62B 5/00; B62B 5/0026; B62B 5/0033; B62B 5/0053; H02J 5/005; H02J 7/04; H02J 7/025; H02J 50/00; H02J 50/001; H02J 50/005; H02J 50/10; H02J 50/12; H02J 50/90; H02J 50/80; H02J 7/00714; H04B 5/0037; B60L 53/38
    USPC .................... 320/104, 107, 109, 157
    See application file for complete search history.

(56) References Cited

U.S. PATENT DOCUMENTS

| | | | |
|---|---|---|---|
| 11,173,794 B2* | 11/2021 | Tsukamoto | B60L 53/38 |
| 2010/0315039 A1* | 12/2010 | Terao | H02J 50/90 320/108 |
| 2015/0108849 A1* | 4/2015 | Robertson | H02J 50/90 307/104 |

(Continued)

FOREIGN PATENT DOCUMENTS

| | | | | |
|---|---|---|---|---|
| JP | 2006101577 A | 4/2006 | | |
| WO | WO-2019067539 A1 * | 4/2019 | ............. | H02J 50/10 |

*Primary Examiner* — Edward Tso
*Assistant Examiner* — Aaron Piggush
(74) *Attorney, Agent, or Firm* — Kim & Stewart LLP

(57) ABSTRACT

A cart power supply device includes a power supply resonance circuit, a notification element, a current detection circuit, and a control circuit. The power supply resonance circuit includes a power supply coil that can be electromagnetically coupled to a power reception coil mounted on a shopping cart or the like. The current detection circuit detects a current flowing through the power supply resonance circuit. The control circuit supplies an alternating current to the power supply resonance circuit at a first level and operates the notification element in a first mode when the detected current is less than a first threshold. The control circuit supplies the alternating current at a second level when the detected current is greater than the first threshold and operates the notification element in a second mode.

20 Claims, 5 Drawing Sheets

(56) References Cited

U.S. PATENT DOCUMENTS

| | | | |
|---|---|---|---|
| 2015/0278038 A1* | 10/2015 | Halker | B60L 53/124 |
| | | | 714/3 |
| 2015/0372498 A1* | 12/2015 | Ichikawa | B60L 53/36 |
| | | | 307/104 |
| 2017/0194817 A1* | 7/2017 | Takatsu | B60L 53/126 |
| 2017/0267111 A1* | 9/2017 | Ochi | H02J 7/02 |
| 2018/0351407 A1* | 12/2018 | Ogishima | H04B 5/0081 |
| 2019/0207427 A1* | 7/2019 | McNeally | A47F 10/04 |
| 2019/0238064 A1* | 8/2019 | Akita | H02M 7/48 |
| 2019/0305567 A1* | 10/2019 | Keeley | H01F 38/14 |
| 2020/0127498 A1* | 4/2020 | Kato | B62B 3/1404 |
| 2021/0001741 A1* | 1/2021 | Miyoshi | G06K 7/10881 |
| 2021/0075260 A1* | 3/2021 | Kato | H02J 50/005 |

* cited by examiner

CART POWER SUPPLY DEVICE

This application is based upon and claims the benefit of priority from Japanese Patent Application No. 2020-002103, filed on Jan. 9, 2020, the entire contents of which are incorporated herein by reference.

FIELD

Embodiments described herein relate generally to a cart power supply device.

BACKGROUND

A non-contact power supply system including a power supply device with a power supply coil and a power reception device with a power reception coil electromagnetically coupled to the power supply coil has been put to practical use. The power supply device generates a magnetic flux in the power supply coil by causing an alternating (AC) current to flow through the power supply coil. The power reception device can be used to charge a rechargeable battery with the induced current generated in a power reception coil electromagnetically coupled to the power supply coil.

In a store or the like, a cart-based commodity registration device including a commodity registration device (such as a tablet device) for registering items to be purchased by a user and a shopping cart basket (storage part) into which the items being purchased are is put has been put into practical use.

A cart power supply device is used to supply power to these cart-based commodity registration devices. This power supply device includes a guide groove for a roller (wheel) of carts and a stopper that limits the movement of the carts. The guide groove and the stopper can be configured such that a power reception coil of the cart-based commodity registration device and a power supply coil of the cart power supply device face each other when the cart-based commodity registration device is positioned at the stopper.

However, in general, positioning these carts at the cart power supply device is left to the users (e.g., store customers). For this reason, there is a possible problem in that the cart-based commodity registration device is not correctly positioned at the stopper, and the cart-based commodity registration device may not receive charging as required.

DETAILED DESCRIPTION

According to an embodiment, a cart power supply device, includes a power supply resonance circuit including a first coil connected to a capacitor. The first coil is configured to electromagnetically couple with a second coil of an external device, such as a shopping cart or the like. A current detection circuit is configured to detect a current flowing through the power supply resonance circuit. A notification element is configured to output a notification to a user of the external device. A power supply control circuit is configured to supply an alternating current to the power supply resonance circuit at a first voltage level, cause the notification element to operate in a first notification mode when the detected current flowing through the power supply resonance circuit is less than a first preset threshold value, supply the alternating current to the power supply resonance circuit at a second voltage level greater than the first voltage level after the detected current flowing through the power supply resonance circuit becomes greater than or equal to the first preset threshold value, and cause the notification element to operate in a second notification mode distinguishable from the first notification mode when the alternating current is supplied to the power supply resonance circuit at the second voltage level.

Hereinafter, certain example embodiments will be described with reference to the drawings.

Figure 1:
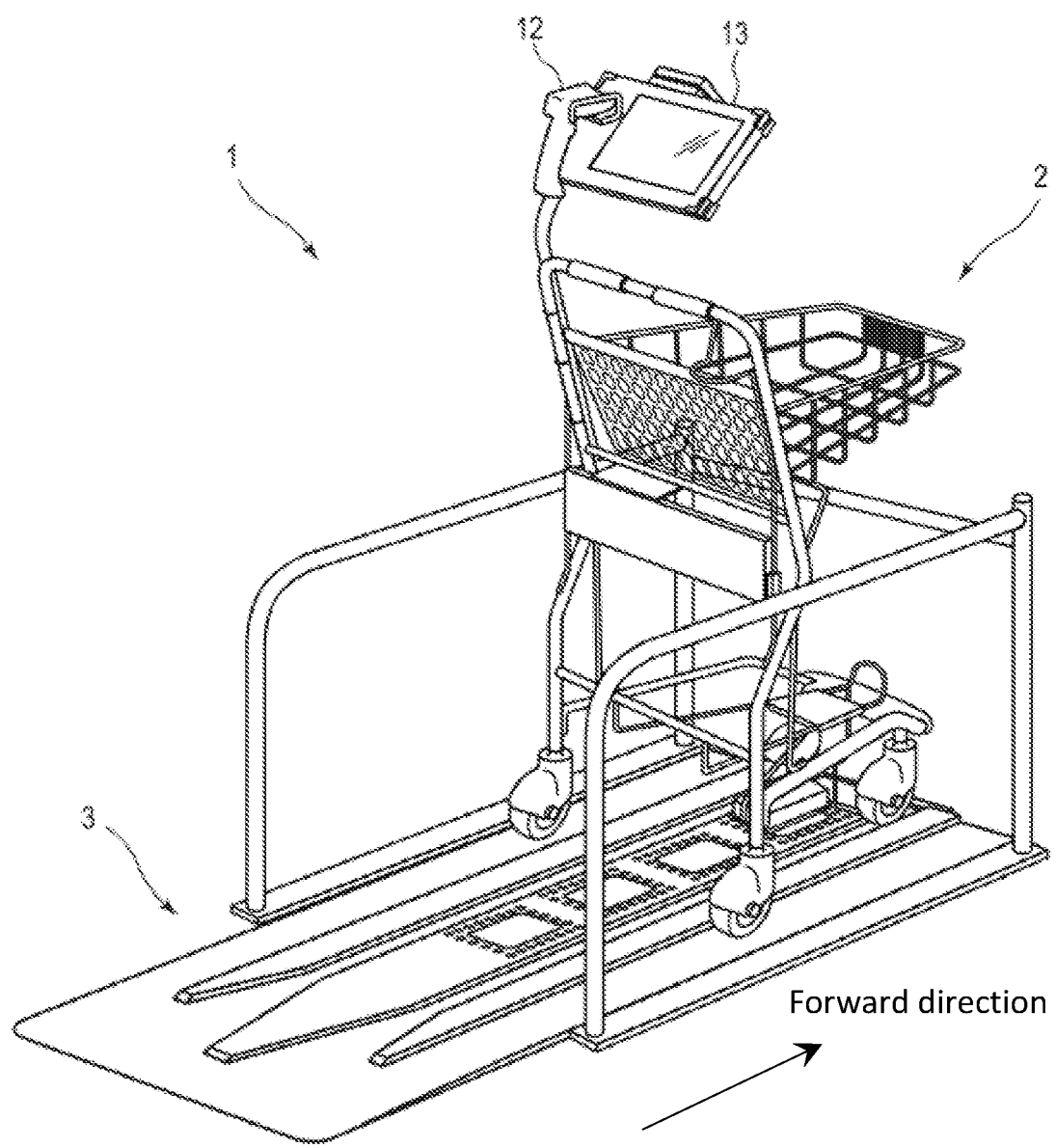
FIG. 1 is a schematic diagram of a non-contact power supply system according to an embodiment.

FIG. 1 depicts a configuration example of a non-contact power supply system 1 according to an embodiment.

The non-contact power supply system 1 transmits power from a cart power supply device to a power reception device by electromagnetic coupling such as electromagnetic induction or magnetic field resonance. The power supply device includes a power supply coil, and the power reception device includes a power reception coil that can be electromagnetically coupled to the power supply coil.

In the example of FIG. 1, the non-contact power supply system 1 includes a cart-based commodity registration device 2 as a power reception device and a cart power supply device 3 as a power supply device.

Figure 2:
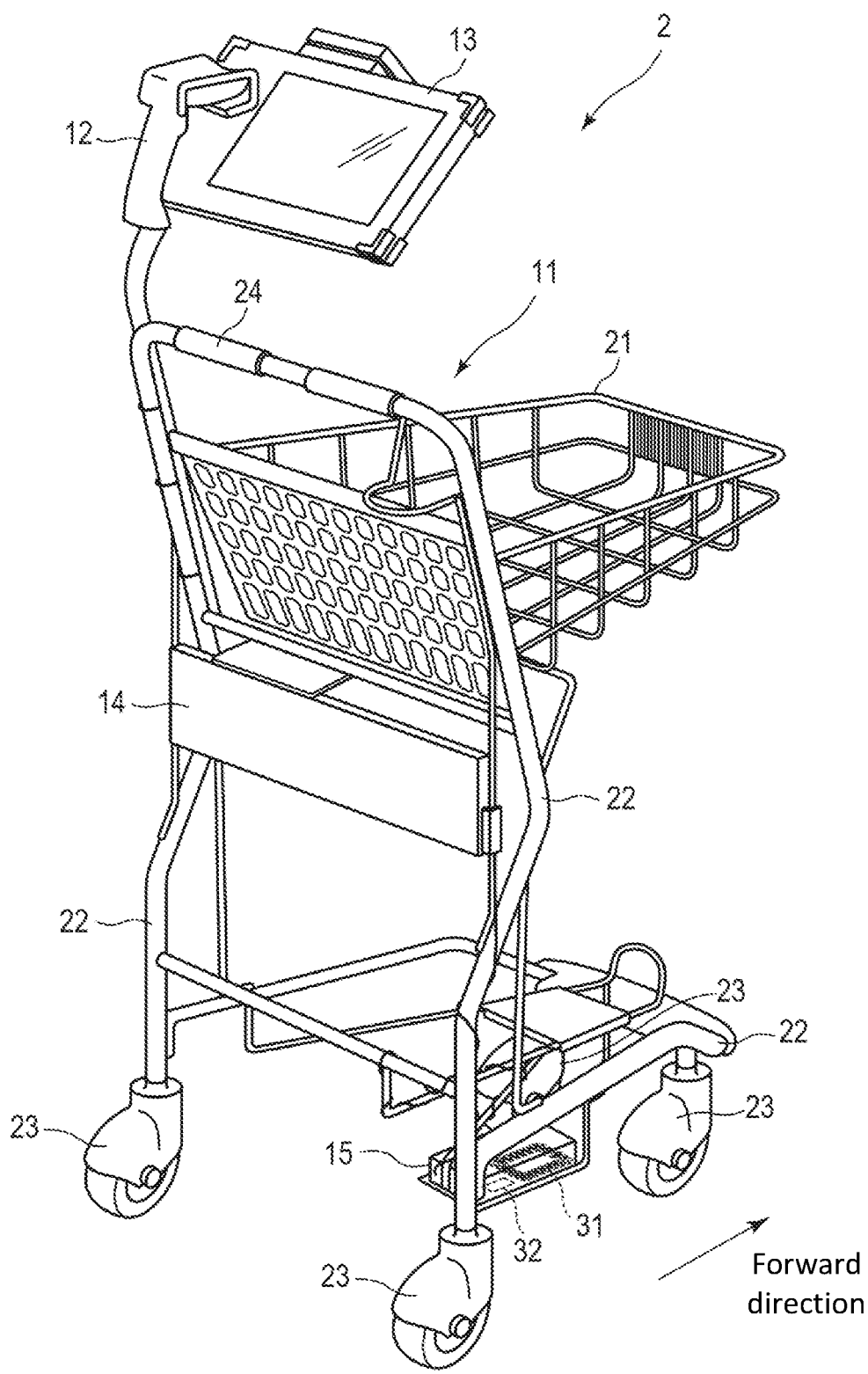
FIG. 2 is a diagram illustrating a configuration example of a cart-based commodity registration device according to an embodiment.

First, a configuration example of the cart-based commodity registration device 2 will be described. FIG. 2 is a diagram of the cart-based commodity registration device 2. The cart-based commodity registration device 2 is, for example, a device that registers a commodity to be put into a basket (storage part) by a user in a store or the like and uses registration information for accounting. The cart-based commodity registration device 2 includes a cart body 11, a commodity reader 12, a commodity registration device 13, a rechargeable battery 14, and a power reception device 15.

The cart body 11 supports the commodity reader 12, the commodity registration device 13, the rechargeable battery 14, and the power reception device 15. The cart body 11 includes a storage basket 21, a frame 22, and a plurality of casters 23.

The storage basket 21 is used for storing commodities being purchased. The storage basket 21 is supported by a frame 22, for example.

The frame 22 structurally supports the storage basket 21, the commodity reader 12, the commodity registration device 13, the power reception device 15, and the rechargeable battery 14. For example, a part of the frame 22 is configured as a handle 24 to be grasped by a user.

The casters 23 are for facilitating the movement of the cart body 11. The casters 23 are provided at the bottom four corners of the frame 22, respectively. Each of the casters 23 includes a wheel that rotates in the movement direction. The cart body 11 moves on the wheels of the casters 23 rolling on a floor surface.

In the present embodiment, the direction of travel when cart-based commodity registration device 2 is pushed from the handle 24 side by a user is referred to as a forward direction. Among the casters 23 the pair of casters on at the front side of the cart body 11 in the forward direction are referred to as front wheels, and a pair of casters at rear side of the cart body 11 are referred to as rear wheels.

The commodity reader 12 is a device that reads information from a commodity. The commodity reader 12 is provided on the frame 22 of the cart body 11. The commodity reader 12 transfers information read from or about the commodity to the commodity registration device 13. The commodity reader 12 can be configured as a scanner that reads a code (for example, a barcode, a two-dimensional code, or the like) attached to a commodity and then acquires information about the commodity based on the code that has been read. The commodity reader 12 may be configured as, for example, an RFID tag reader, a wireless tag reader, or the like that reads an RFID tag or other wireless tag or the like attached to a commodity when the commodity is put in the storage basket 21.

The commodity registration device 13 generates a commodity list. The commodity registration device 13 is provided on the frame 22 of the cart body 11. The commodity registration device 13 includes, for example, an information terminal such as a tablet-type terminal in which a commodity registration program is installed. The commodity registration device 13 displays a list of commodities that have been put into the storage basket 21 by the user on the basis of the commodity information from the commodity reader 12. The commodity registration device 13 may be used to settle (receive payment) a sales transaction on the basis the prices of the commodities on the commodity list. The commodity registration device 13 can include, for example, a communication interface, a processor, a memory, a touch panel, and a rechargeable battery.

The communication interface is an interface for communicating with another device. For example, the commodity registration device 13 acquires the commodity information transferred from the commodity reader 12 via the communication interface. The communication interface can transmit the generated commodity list to a store server or the like.

The processor is an arithmetic element that executes arithmetic processing. The processor is configured as, for example, a central processing unit (CPU). The processor performs various processes based on a program stored in the memory.

The memory is a storage device that stores programs and data. The memory includes, for example, one or more of ROM (read-only memory), RAM (random access memory) that temporarily stores data, and a non-volatile storage unit that stores data.

The touch panel is a device that displays a screen and generates an operation signal based on a user input operation on the screen. The touch panel includes a display and a touch sensor. The display displays a screen based on display data (screen data) supplied from a processor or a graphics controller. The touch sensor generates an input operation signal indicating a position on the screen touched by a user.

The rechargeable battery 14 is configured to supply direct-current power for operations of the commodity registration device 13 and the commodity reader 12. The rechargeable battery 14 is, for example, a lithium ion rechargeable battery including an electrode group in which a positive electrode and a negative electrode are stacked with a separator interposed therebetween. The rechargeable battery 14 is mounted on the frame 22 of the cart body 11, for example. The rechargeable battery 14 includes an input terminal and an output terminal.

An input terminal of the rechargeable battery 14 is connected to the power reception device 15. The rechargeable battery 14 is charged when direct-current power of a predetermined voltage is input to the input terminal. That is, the rechargeable battery 14 is charged by the direct-current power supplied from the power reception device 15.

An output terminal of the rechargeable battery 14 is connected to the commodity registration device 13 and the commodity reader 12. When a load is connected to the output terminal, the rechargeable battery 14 supplies direct-current power to the load. That is, the rechargeable battery 14 supplies direct-current power to the commodity registration device 13 and the commodity reader 12.

The power reception device 15 receives power supplied from the cart power supply device 3 via electromagnetic coupling such as electromagnetic induction or magnetic field resonance. That is, the power reception device 15 receives power from the cart power supply device 3 without being electrically connected to the cart power supply device 3 (that is, power is transferred in a non-contact state or wireless state). The power reception device 15 supplies direct-current power to the rechargeable battery 14 according to the received wireless power. The power reception device 15 is provided on the frame 22 of the cart body 11. The power reception device 15 includes a power reception coil 31 and a power reception circuit 32.

The power reception coil 31 is an element that generates inductive power by coupling of magnetic fluxes. For example, the power reception coil 31 is formed as a coil pattern on a printed circuit board. In addition, for example, the power reception coil 31 may be configured as a wire-wound structure in which an insulated electric wire is wound in a planar shape. The power reception coil 31 is attached to the frame 22 of the cart body 11 so that the coil plane is disposed parallel to the floor surface.

The power reception coil 31 constitutes a resonance circuit (power reception resonance circuit) connected to a resonance capacitor in series or in parallel. The power reception coil 31 generates an induced current by coupling a magnetic flux generated in a power supply coil.

The power reception circuit 32 supplies direct-current power to the rechargeable battery 14 from an induced current generated in the power reception coil 31. The power reception circuit 32 includes, for example, a rectifying-smoothing circuit and a voltage conversion circuit.

The rectifying-smoothing circuit rectifies, smooths, and outputs the induced current flowing from the power reception coil 31. The rectifying-smoothing circuit includes a rectifying bridge including a diode or a plurality of diodes connected in series to the power reception coil 31, and a smoothing capacitor connected in parallel to the power reception coil 31. The rectifying-smoothing circuit outputs a voltage between both terminals of the smoothing capacitor.

The voltage conversion circuit is a DC/DC converter that converts an output voltage of the rectifying-smoothing circuit into a direct-current voltage corresponding to a load. The voltage conversion circuit is connected to both terminals of the smoothing capacitor of the rectifying-smoothing circuit. For example, the voltage conversion circuit converts the voltage between the both terminals of the smoothing capacitor of the rectifying-smoothing circuit into a voltage corresponding to the specification of the rechargeable battery 14, and outputs direct-current power (charging power) used for charging the rechargeable battery 14 to the rechargeable battery 14. In a case where the output voltage of the rectifying-smoothing circuit directly corresponds to the specification of the rechargeable battery 14, the voltage conversion circuit may be omitted.

According to the above-described configuration, when the magnetic flux coupled to the power reception coil 31 of the power reception device 15 of the cart-based commodity registration device 2 changes, an induced current is generated in the power reception coil 31. The power reception device 15 rectifies and smooths the induced current and performs voltage conversion according to a rated voltage of the rechargeable battery 14, thereby supplying charging power to the rechargeable battery 14. Thus, the power reception device 15 performs wireless charging for charging the rechargeable battery 14 by using electric power transmitted in a non-contact manner.

Figure 3:
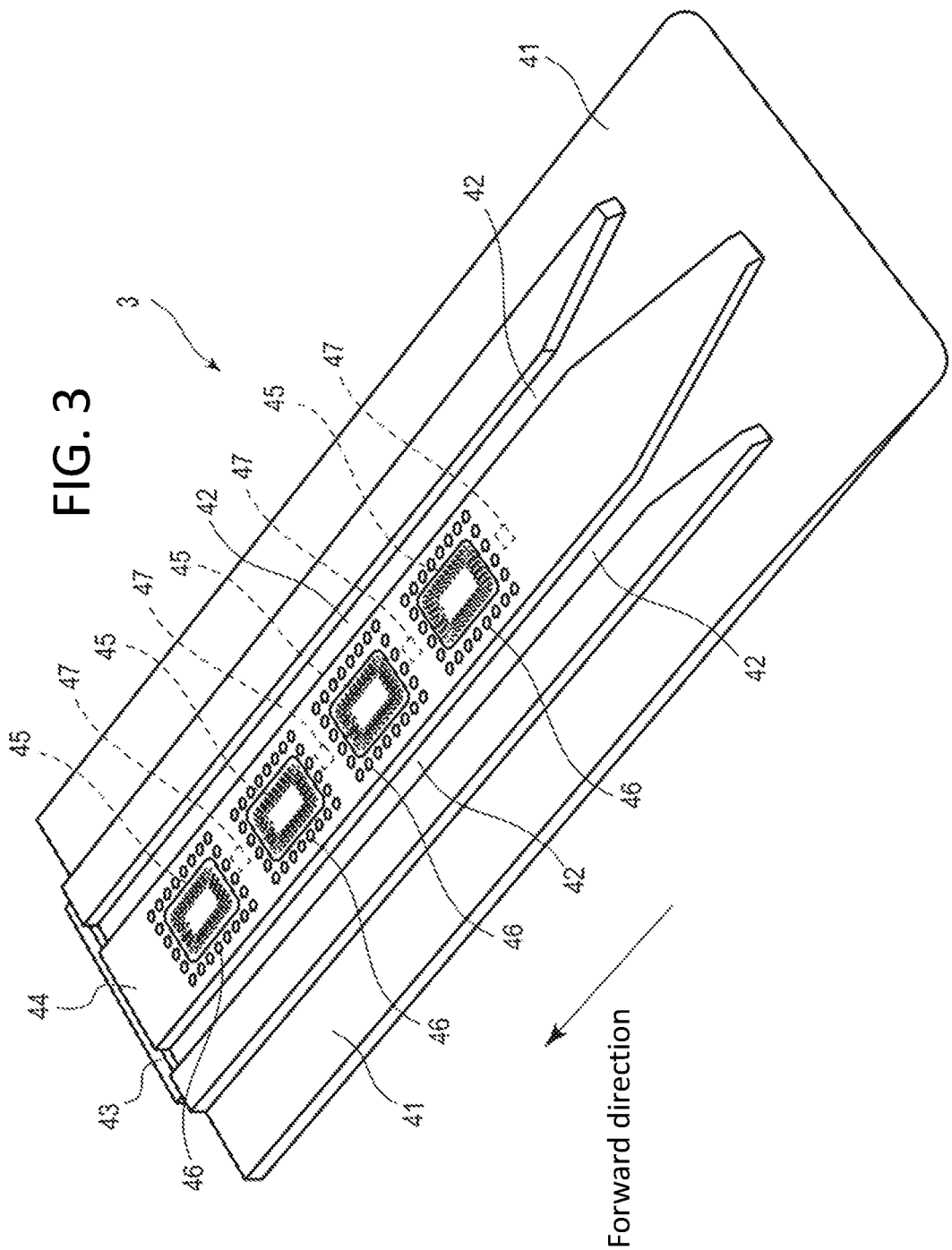
FIG. 3 is schematic diagram of a cart power supply device according to an embodiment.

Next, an example of the configuration of the cart power supply device 3 will be described. FIG. 3 depicts a cart power supply device 3. The cart power supply device 3 wirelessly supplies power to the cart-based commodity registration device 2. The cart power supply device 3 includes a power supply base 41, a guide groove 42, a stopper 43, a power supply surface 44, a power supply coil 45, a LED module 46, and a power supply control circuit 47. The cart power supply device 3 may include, for example, a plurality of power supply coils 45, a plurality of LED modules 46, and a plurality of power supply control circuits 47. In the example of FIG. 3, the cart power supply device 3 includes, for example, four sets of a power supply coil 45, a LED module 46, and a power supply control circuit 47. Since the power supply coils 45, the LED modules 46, and the power supply control circuits 47 respectively have the same configuration, only one of each type will be described as a representative of each instance.

The power supply base 41 is a housing in which the guide groove 42, the stopper 43, the power supply surface 44, the power supply coil 45, the LED modules 46, and the like are provided. The power supply base 41 is installed on a floor surface.

The guide groove 42 guides the cart-based commodity registration device 2 into the power supply base 41. The guide groove 42 is configured as, for example, a groove that guides the wheels of the casters 23 of the cart-based commodity registration device 2. In the example of FIG. 2, the guide grooves 42 are configured as a pair of grooves for guiding the front wheels of the cart-based commodity registration device 2.

The stopper 43 sets the stop position of the cart-based commodity registration device 2. The stopper 43 is configured as a member that abuts the front wheel of a cart-based commodity registration device 2 that has entered along the guide groove 42. The stopper 43 stops the cart-based commodity registration device 2 by coming into contact with the front wheel of the cart-based commodity registration device 2.

The power supply surface 44 is a surface on which a power supply coil 45 and a LED module 46 are provided. For example, the power supply surface 44 is formed between the pair of guide grooves 42 to be parallel with the floor surface. The position at which the power supply surface 44 is provided may be changed as appropriate in accordance with the position of the power reception coil of the cart-based commodity registration device 2.

The power supply coil 45 generates a magnetic field that changes in accordance with an alternating current supplied thereto. For example, the power supply coil 45 is formed as a coil pattern on a printed circuit board. In addition, the power supply coil 45 may be configured as a wire-wound structure in which an insulated electric wire is wound in a planar shape.

The power supply coil 45 is embedded in the power supply surface 44 so that the conductive wire of the coil is disposed parallel to the power supply surface 44. The power supply coil 45 is disposed so that the magnetic flux generated in the power supply coil 45 can be coupled to the power reception coil 31 when power supply coil 45 faces the power reception coil 31. The power supply coil 45 is configured to be larger in size than the power reception coil. The power supply coil 45 may be provided above a magnetic body.

The power supply coil 45 constitutes a resonance circuit (power supply resonance circuit) formed by connecting a resonance capacitor in series or in parallel. The energy stored in the resonant capacitor each time switching is performed by a semiconductor switch 56 is discharged to the power supply coil 45 as an alternating current. The alternating current generates a magnetic flux in the power supply coil 45, and the generated magnetic flux is coupled to power reception coil 31 to generate an induced current in power reception coil 31. That is, the power supply coil 45 transmits power to the power reception coil by the magnetic field resonance method. When the magnetic field resonance method is used for power transmission, the self-resonance frequency of the power supply resonance circuit is configured to be the same or substantially the same as the self-resonance frequency of the power-receiving resonance circuit. This improves a power transmission efficiency when the power supply coil and the power reception coil are electromagnetically coupled.

At least one of the plurality of power supply coils 45 is at a position facing the power reception coil 31 of the cart-based commodity registration device 2 when the front wheel of the cart-based commodity registration device 2 is in contact with the stopper 43. The other power supply coils 45 are at positions facing the power reception coil 31 of another cart-based commodity registration device 2 when multiple cart-based commodity registration apparatuses 2 are stacked together and stored in a nested manner.

The LED module 46 is a notification element including one or more LED elements (light emission elements) as light sources. The LED module 46 is formed by arranging and sealing a plurality of light emission elements on a tape-like flexible substrate, for example. Each light emission element of the LED module 46 emits light when a current is supplied from an LED power supply circuit 59. In each light emission element of the LED module 46, a light emission portion that emits light is provided in the vicinity of the power supply coil 45 on the power supply surface 44. For example, the LED module 46 has a light emission portions provided on the power supply surface 44 so as to surround a power supply coil 45. In the LED module 46, the light emission element can be disposed at an angle so as to be more easily viewed by a user pushing the cart-based commodity registration device 2 along the pair of guide grooves 42.

The power supply control circuit 47 controls the supply of current to the power supply coil 45 and the supply of current to the LED module 46.

Figure 4:
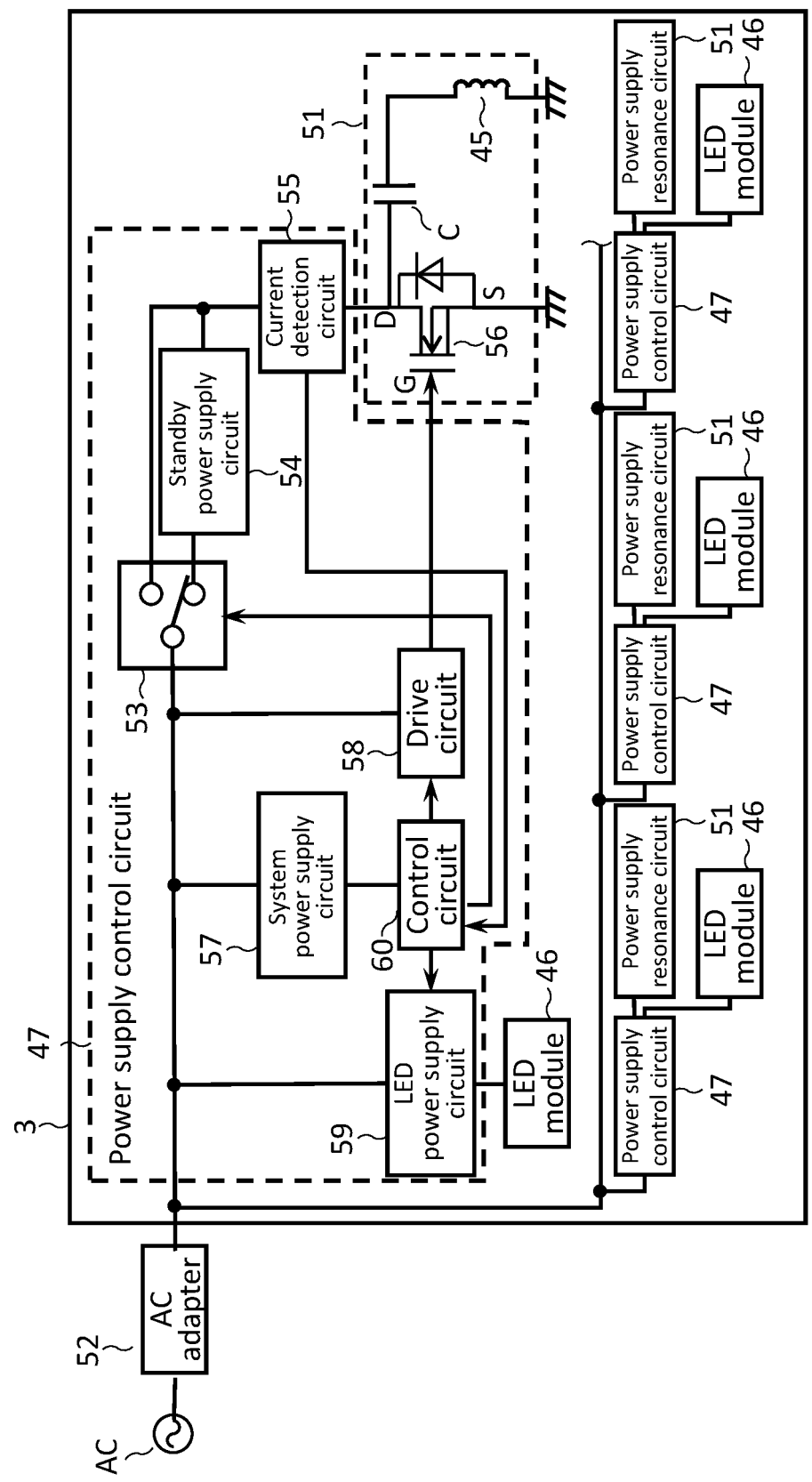
FIG. 4 depicts circuit aspects of a power supply control circuit according to an embodiment.

Next, a configuration example of the power supply control circuit 47 will be described. FIG. 4 is a schematic diagram of a power supply control circuit 47. As shown in FIG. 4, a series connection of the power supply coil 45 and a resonant capacitor C and the semiconductor switch 56 constitute a power supply resonance circuit 51. That is, the power supply resonance circuit 51 includes a series connection of the power supply coil 45 and the resonance capacitor C, and the semiconductor switch 56. A LED module 46 is provided for each power supply resonance circuit 51. A power supply control circuit 47 is also provided for each power supply resonance circuit 51.

Each power supply control circuit 47 operates a power supply coil 45 and a LED module 46 by using direct-current power supplied from a commercial power supply AC via a power supply such as an AC adapter 52. A power conversion circuit that converts AC power from the commercial power supply AC into direct-current power may be provided in the housing of the cart power supply device 3. Although in this example one AC adapter 52 supplies power to the four power supply control circuits 47, an AC adapter 52 may be separately provided for each power supply control circuit 47 in other examples.

The power supply control circuit 47 includes a power supply voltage changeover switch 53, a standby power supply circuit 54, a current detection circuit 55, a system power supply circuit 57, a drive circuit 58, an LED power supply circuit 59, and a control circuit 60.

The power supply voltage changeover switch 53 is a circuit that switches the voltage applied to the power supply resonance circuit 51 under the control of the control circuit 60. The power supply voltage changeover switch 53 includes, for example, one input terminal and two output terminals. The power supply voltage changeover switch 53 switches the output terminal connected to the input terminal between the two output terminals under the control of the control circuit 60. The input terminal of the power supply voltage changeover switch 53 is connected to the AC adapter 52. One output terminal of the power supply voltage changeover switch 53 is connected to a drain terminal of the semiconductor switch 56 constituting the power supply resonance circuit 51 via the current detection circuit 55. The other output terminal of the power supply voltage changeover switch 53 is connected to an input port of the standby power supply circuit 54.

The standby power supply circuit 54 has an input port connected to one output terminal of the power supply voltage changeover switch 53, and an output port connected to the drain terminal of the semiconductor switch 56 via the current detection circuit 55. The standby power supply circuit 54 outputs a direct-current voltage at a voltage level lower than the direct-current voltage output from the AC adapter 52. The standby power supply circuit 54 is, for example, a DC-DC converter that steps down and outputs a direct-current voltage from the AC adapter 52, and operates in a standby mode.

According to state of the power supply voltage changeover switch 53, the voltage applied to the drain terminal of the semiconductor switch 56 is switched between the voltage from the AC adapter 52 and the voltage from the standby power supply circuit 54 under the control of the control circuit 60.

The current detection circuit 55 detects a current flowing through the drain terminal of the semiconductor switch 56, and outputs detection result to the control circuit 60. In general, the current detection circuit 55 may be provided at any position so long as it can detect the current flowing through the power supply coil 45 of the power supply resonance circuit 51.

The semiconductor switch 56 is a switch element that is turned on and off by a drive signal from the drive circuit 58. Although one semiconductor switch 56 will be described here, a circuit configuration using two semiconductor switches 56 is also possible. The semiconductor switch 56 is, for example, a silicon-based FET or an FET formed of a wide bandgap semiconductor such as SiC, GaN, gallium oxide, or diamond. The semiconductor switch 56 includes a drain terminal, a gate terminal, and a source terminal. The drain terminal of the semiconductor switch 56 is connected, via the current detection circuit 55, to an output port of the standby power supply circuit 54 and one output terminal of the power supply voltage changeover switch 53. Further, the drain terminal is also connected to the resonance capacitor C of the power supply resonance circuit 51. The gate terminal of the semiconductor switch 56 is connected to the drive circuit 58. The source terminal of the semiconductor switch 56 is connected to GND.

A drive signal from the drive circuit 58 is input to the gate terminal of the semiconductor switch 56. The drive signal is configured as a pulse signal, for example. The semiconductor switch 56 controls the power supply resonance circuit 51 with a drive signal that switches between an H level and an L level.

The system power supply circuit 57 is a direct-current power supply for operating the control circuit 60. The system power supply circuit 57 has an input port connected to the AC adapter 52 and an output port connected to the control circuit 60. For example, the system power supply circuit 57 is a DC-DC converter that generates a direct-current voltage from the AC adapter 52 and outputs a direct-current voltage to the control circuit 60.

The drive circuit 58 drives the semiconductor switch 56 under the control of the control circuit 60. The drive circuit 58 generates the drive signal and outputs the drive signal to the gate terminal of the semiconductor switch 56. For example, the drive circuit 58 supplies a pulse signal having a duty (on-off ratio) of 50% under the control of the control circuit 60.

The LED power supply circuit 59 drives the LED module 46 under the control of the control circuit 60. In the LED power supply circuit 59, an input port is connected to the AC adapter 52, an output port is connected to the LED module 46, and a control port that receives a control signal from the control circuit 60 is connected to the control circuit 60. The LED power supply circuit 59 is a DC-DC converter that supplies power for driving the light emission elements of the LED module 46 to the LED module 46.

The LED power supply circuit 59 drives the LED module 46 in one of a first operation mode (in which the light emission elements of the LED module 46 are operated in a first pattern) and a second operation mode (in which the light emission elements of the LED module 46 are operated in a second pattern). The LED power supply circuit 59 switches between the first operation mode and the second operation mode in accordance with a control signal from the control circuit 60.

The first operation mode is, for example, a mode in which the light emission element(s) of the LED module 46 blinks at predetermined time intervals. The second operation mode is a mode in which the light emission element of the LED module 46 blinks at a time interval longer than that in the first operation mode. In general, the first operation mode and the second operation mode may be any operation modes as long as the operation patterns are distinguishable from each other when viewed by a user or the like.

Further, for example, when the LED module 46 includes a plurality of light emission elements having different emission colors, the LED power supply circuit 59 may be configured to turn on a light emission element of a first color in the first operation mode and turn on a light emission element of a second color in the second operation mode.

The control circuit 60 controls operations of the power supply voltage changeover switch 53, the drive circuit 58, and the LED power supply circuit 59. The control circuit 60 switches the connection state of the power supply voltage changeover switch 53 along with the first operation mode and the second operation mode. Further, the control circuit 60 controls driving (on/off) of the LED module 46 by the LED power supply circuit 59. The control circuit 60 controls the driving of the semiconductor switch 56 by the drive circuit 58 by a pulse signal output.

The control circuit 60 comprises, for example, a microcomputer. The control circuit 60 may include, for example, a processor and a recording medium (memory) storing a program to be executed by the processor. In this case, the processor executes the program in the memory to control the operations of the power supply voltage changeover switch 53, the drive circuit 58, and the LED power supply circuit 59. The control circuit 60 may be configured as an ASIC (Application Specific Integrated Circuit), a PLC (Programmable Logic Controller), or the like.

The control circuit 60 determines whether to perform wireless charging based on the detection result from the current detection circuit 55 and a preset condition.

The control circuit 60 controls the power supply voltage changeover switch 53 so as to connect the AC adapter 52 to the power supply resonance circuit 51 (more particularly, the drain terminal of the semiconductor switch 56) when wireless charging is to be executed. Thus, the voltage from the AC adapter 52 is applied to the drain terminal of the semiconductor switch 56 during wireless charging. This state is referred to as a power supply mode.

In the power supply mode, the control circuit 60 controls the drive circuit 58 to turn the semiconductor switch 56 on and off.

When the semiconductor switch 56 is turned on and off, the semiconductor switch 56, the resonance capacitor C, and the power supply coil 45 exchange energy in the power supply resonance circuit 51, and an alternating current flows through the power supply coil 45.

As a result, the magnetic flux generated in the power supply coil 45 periodically changes.

The control circuit 60 controls the power supply voltage changeover switch 53 so as to connect the AC adapter 52 to the standby power supply circuit 54 during a standby mode in which wireless charging is not being executed. Thus, the voltage from the standby power supply circuit 54 is applied to the power supply resonance circuit 51 (more particularly, the drain terminal of the semiconductor switch 56). This operating or connection state is referred to as a standby mode.

Even in the standby mode, the control circuit 60 still controls the drive circuit 58 to turn the semiconductor switch 56 on and off.

So long as the semiconductor switch 56 is being turned on and off, energy is exchanged in the same manner as described above, and an alternating current flows through the power supply coil 45. However, since the voltage from the standby power supply circuit 54 is less than the voltage from the AC adapter 52, the amplitude of the alternating current flowing through the power supply coil 45 via the resonance capacitor C of the power supply resonance circuit 51 is lower than that in the power supply mode. As a result, the magnetic flux generated in the power supply coil 45 becomes weaker than that in the power supply mode.

The control circuit 60 normally operates the power supply control circuit 47 in the standby mode. That is, the default mode is the standby mode. While in this standby mode state, when the cart-based commodity registration device 2 enters above the power supply base 41 of the cart power supply device 3 and the power supply coil 45 and the power reception coil 31 come close to each other, and are electromagnetically coupled to each other, the load viewed from the cart power supply device 3 increases. As a result, the current value detected by the current detection circuit 55 increases.

When the current value detected by the current detection circuit 55 increases, the control circuit 60 switches from the standby mode to the power supply mode to operate the power supply control circuit 47.

It is assumed that the cart-based commodity registration device 2 enters the power supply base 41 of the cart power supply device 3, the power supply coil 45 and the power reception coil 31 approach each other and are electromagnetically coupled to each other, and then the cart-based commodity registration device 2 further advances on the power supply base 41. In this case, the load viewed from the cart power supply device 3 decreases, and the current value detected by the current detection circuit 55 decreases. In this case, since power cannot be efficiently transmitted from the cart power supply device 3 to the cart-based commodity registration device 2, the control circuit 60 operates the power supply control circuit 47 in the standby mode. That is, the control circuit 60 operates the power supply mode only when the cart power supply device 3 can efficiently transmit power to the cart-based commodity registration device 2.

Figure 5:
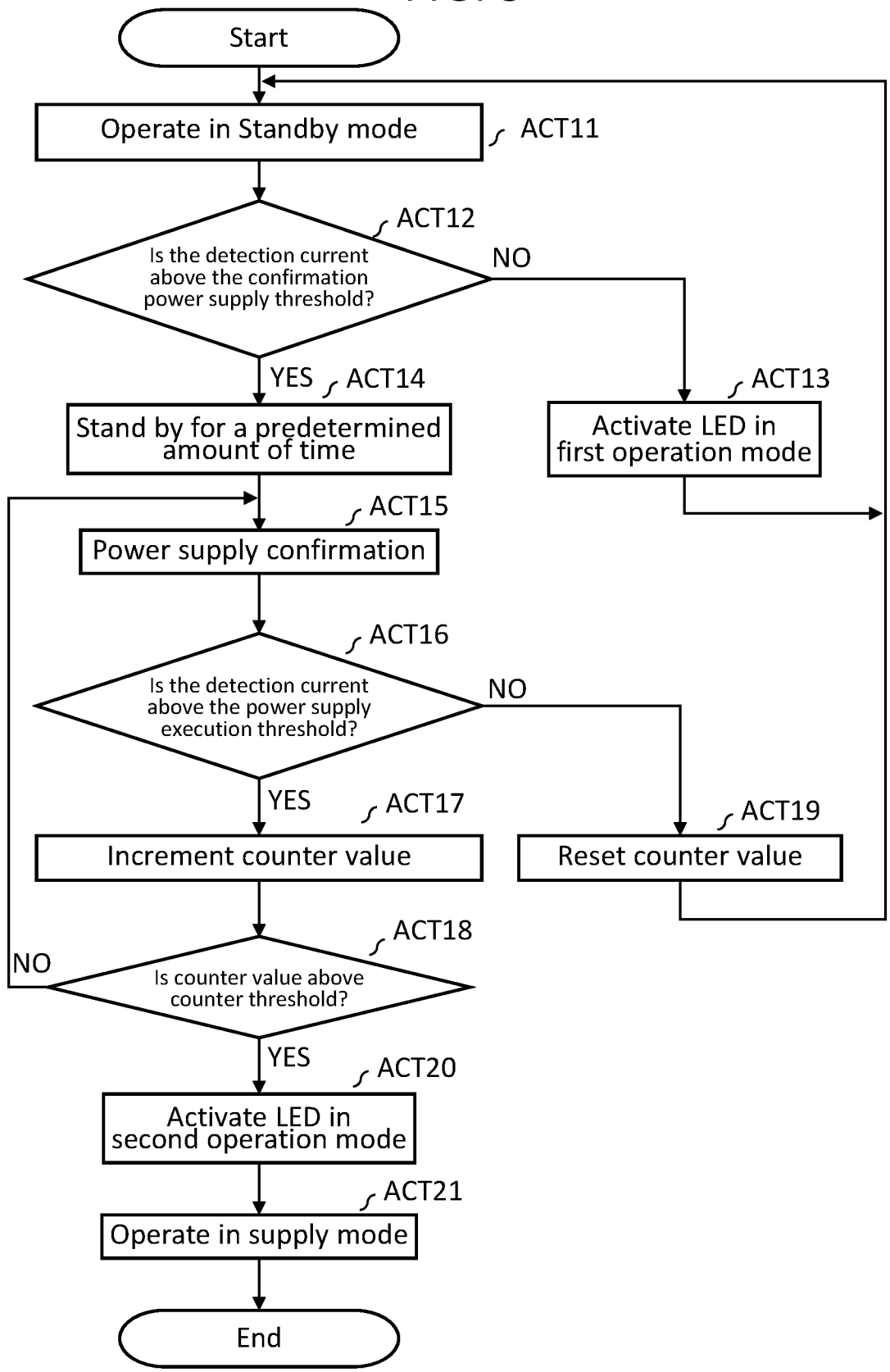
FIG. 5 is a flowchart of an example operation of a power supply control circuit according to an embodiment.

FIG. 5 is a flowchart for explaining the operation of the power supply control circuit 47.

Initially, after startup (start), the control circuit 60 operates the power supply control circuit 47 in the standby mode (ACT11).

The control circuit 60 during this time determines whether the presently detected current value is equal to or greater than a preset threshold (referred to as a confirmation power supply threshold) based on the detection result from the current detection circuit 55 (ACT12).

When the control circuit 60 determines that the current value detected by the current detection circuit 55 is less than the preset confirmation power supply threshold (ACT12, NO), the control circuit 60 controls the LED power supply circuit 59 to operate the LED module 46 in the first operation mode, and proceeds to the process of ACT11 (ACT13).

Thus, in this example, the control circuit 60 causes the light emission element of the LED module 46 to blink at predetermined time intervals until the current detection circuit detects a current value equal to or larger than the confirmation power supply threshold.

When the control circuit 60 determines that the current value detected by the current detection circuit 55 is equal to or greater than the confirmation power supply threshold, (which has been set in advance) (ACT12, YES), the control circuit 60 waits for a predetermined time after the current value equal to or greater than the confirmation power supply threshold has been detected (ACT14).

The control circuit 60 performs power supply confirmation after a predetermined time elapses after the detected current value becomes equal to or greater than the confirmation power supply threshold (ACT15). The power supply confirmation is a process of temporarily operating the power supply control circuit 47 in a power supply mode.

If it is determined that the current value detected by the current detection circuit 55 is equal to or greater than confirmation power supply threshold, it can be estimated that the power reception coil 31 has approached the power supply coil 45. Here, if the power reception coil 31 in the cart-based commodity registration device 2 stays facing the power supply coil 45, it is expected that the current detection circuit 55 will continue to detect a current value equal to or greater than the confirmation power supply threshold. However, if the cart-based commodity registration device 2 merely passes over the power supply coil 45, it is expected that a current equal to or greater than the confirmation power supply threshold will be detected only for a short time.

Therefore, the control circuit 60 shifts to the power supply mode only after a predetermined amount of time has elapsed. In the power supply mode, the supplying of power from the AC adapter 52 to the power supply coil 45 is continued and the output of power transmission is increased for executing power supply confirmation).

The control circuit 60 then determines whether the detected current value is equal to or greater than a preset threshold (referred to as a power supply execution threshold) based on the detection result from the current detection circuit 55 during the power supply confirmation period (which is a temporary power supply mode) (ACT16). The power supply execution threshold is a voltage value greater than at least the confirmation power supply threshold value.

When the control circuit 60 determines that the current value detected by the current detection circuit 55 during the confirmation power supply is equal to or greater than the preset power supply execution threshold (ACT16, YES), the control circuit 60 counts up the counter (ACT17). The control circuit 60 includes, for example, a recording medium or a memory having a storage area for storing the value of the counter. In ACT16, the control circuit 60 counts up (increments) the counter value each time it is determined that the current value detected by the current detection circuit 55 is equal to or greater than preset power supply execution threshold.

The control circuit 60 determines whether the value of the counter is equal to or greater than a preset counter threshold (ACT18). When it is determined that the value of the counter is less than the preset counter threshold (ACT18, NO), the control circuit 60 continues the confirmation power supply (ACT15).

When the control circuit 60 determines that the current value detected by the current detection circuit 55 during the confirmation power supply is less than the preset power supply execution threshold (ACT16, NO), the control circuit 60 resets the value of the counter (ACT19) and proceeds to the process of ACT11.

When it is determined in ACT18 that the value of the counter is equal to or greater than the preset counter threshold (ACT18, YES), the control circuit 60 controls the LED power supply circuit 59 to operate or activate the LED module 46 in the second operation mode (ACT20).

The control circuit 60 operates the power supply control circuit 47 in the power supply mode (ACT21). Thus, the power from the AC adapter 52 is supplied to the power supply coil 45 continuously. As a result, the power reception device 15 of the cart-based commodity registration device 2 can charge the rechargeable battery 14.

That is, when the current detection circuit 55 detects a current value equal to or greater than the power supply execution threshold continuously for a number of times equal to or greater than the counter threshold, the control circuit 60 causes the LED module 46 to operate in the second operation mode and starts power supply to the power reception device 15 by the power supply coil 45. This corresponds the power reception coil 31 in the cart-based commodity registration device 2 stably facing the power supply coil 45. That is, the cart-based commodity registration device 2 is stationary and correctly positioned for charging.

When the current detection circuit 55 detects a current value less than the power supply execution threshold before the current detection circuit 55 detects a current value equal to or greater than the power supply execution threshold continuously for a number of times equal to or greater than the counter threshold, the control circuit 60 resets the counter and shifts to the standby mode. This corresponds to the cart-based commodity registration device 2 being passed over the power supply coil 45, and thus the current equal to or larger than the power supply execution threshold is detected only for a short time.

When the power supply to the power reception device 15 is completed, the control circuit 60 ends the processing depicted in FIG. 5. However, the control circuit 60 may determine whether to continue the power supply mode based on the detection result of the current detection circuit 55 even during the power supply mode. For example, in a case where the detection result of the current detection circuit 55 is less than the power supply execution threshold during the power supply mode, the control circuit 60 may terminate the power supply mode and return to the process of ACT11. By such an operation, for example, the user can be notified of the full charging of the rechargeable battery 14.

As described above, the cart power supply device 3 includes the power supply resonance circuit 51, the LED module 46, the current detection circuit 55, and the power supply control circuit 47. The power supply resonance circuit 51 includes a power supply coil 45 that can be electromagnetically coupled to a power reception coil 31 of the power reception device 15 used to charge the rechargeable battery 14 mounted on the cart-based commodity registration device 2. The current detection circuit 55 detects a current flowing through the power supply resonance circuit 51. The power supply control circuit 47 supplies an alternating current to the power supply resonance circuit 51, and operates the LED module 46 in the first operation mode when the detection result of the current detection circuit 55 is less than a preset power supply execution threshold. When the detection result of the current detection circuit 55 is equal to or greater than the power supply execution threshold, the power supply control circuit 47 operates the LED module 46 in a second mode that is different (e.g., visually distinct) from the first operation mode, and performs power supply (wireless charging) to the power reception device 15 via the power supply resonance circuit 51.

Thus, the cart power supply device 3 can notify a user whether wireless charging is being performed. Thus, the cart power supply device 3 can prompt the user to place the cart-based commodity registration device 2 at a position on the power supply base 41 of the cart power supply device 3 where wireless charging is possible.

In an above-described embodiment, the control circuit 60 controls the LED power supply circuit 59 to operate the LED module 46 in either a first mode or a second mode, but the present disclosure is not limited to this configuration. The control circuit 60 may be configured to control the LED power supply circuit 59 to operate the LED module 46 in a third mode different from the first mode and the second mode when performing the counter value reset in ACT19 of FIG. 5.

In an above-described embodiment, the notification element is the LED module 46, but the present disclosure is not limited to this configuration. The notification element may be, for example, a speaker (sound output device). That is, the control circuit 60 may be configured to prompt a user to place the cart-based commodity registration device 2 at a proper position on the power supply base 41 of the cart power supply device 3 by transferring a signal to a speaker so that sound indicating that the cart power supply device 3 is operating in the power supply mode is output from the speaker.

The cart power supply device 3 may be configured to prompt a user to place the cart-based commodity registration device 2 at a position on the power supply base 41 of the cart power supply device 3 where wireless charging is possible by other means. For example, the cart power supply device 3 may include a communication interface that establishes wireless communication with the commodity registration device 13 of the cart-based commodity registration device 2 when the confirmation power supply is performed. For example, when the cart power supply device 3 starts the power supply mode operation in ACT21 of FIG. 5, the cart power supply device 3 transmits information indicating that the wireless charging is started to the commodity registration device 13 and displays the information. In addition, for example, in ACT19 of FIG. 5, when performing the count reset, the cart power supply device 3 transmits information prompting the user to place the cart-based commodity registration device 2 at a position on the power supply base 41 of the cart power supply device 3 at which wireless charging is possible to the commodity registration device 13, and displays the information.

In an above-described embodiment, the control circuit 60 is configured to start supplying power to the power reception device 15 based on the number of times the current detection circuit 55 detects a current value equal to or greater than the power supply execution threshold, but the present disclosure is not limited to this configuration. The control circuit 60 may be configured to start power supply to the power reception device 15 based on the length of time or the like that the current detection circuit 55 continuously detects a current value equal to or greater than the power supply execution threshold.

In an above-described embodiment, the power reception device of the cart-based commodity registration device 2 is configured to supply charging power to rechargeable battery 14, but the present disclosure is not limited to this configuration.

The power reception device 15 may be configured to directly supply charging power to the commodity registration device 13 or the like.

In an above-described embodiment, the commodity registration device 13 is installed in the cart body 11 of the cart-based commodity registration device 2, but the present disclosure is not limited to this configuration.

The commodity registration device 13 of the cart-based commodity registration device 2 may be an information terminal (for example, a smartphone, a tablet terminal, or a digital camera) carried by the user.

That is, the rechargeable battery 14 of the cart-based commodity registration device 2 may be configured to supply power to an information terminal carried by a cart user.

The functions described for above-described embodiments may be implemented by a computer executing software, or some or all of the described functions may be implemented by combinations of hardware and software, or different functions may be provided by appropriately selecting either software or hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cart power supply device, comprising:
   a power supply resonance circuit including a first coil connected to a capacitor, the first coil configured to electromagnetically couple with a second coil of a cart;
   a current detection circuit configured to detect a current flowing through the power supply resonance circuit;
   a notification element configured to output a notification to a user of the cart; and
   a power supply control circuit configured to:
      supply an alternating current to the power supply resonance circuit at a first voltage level,
      cause the notification element to operate in a first notification mode when the detected current flowing through the power supply resonance circuit is less than a first preset threshold value corresponding to the cart being incorrectly positioned relative to the first coil for charging,
      supply the alternating current to the power supply resonance circuit at a second voltage level greater than the first voltage level after the detected current flowing through the power supply resonance circuit becomes greater than or equal to the first preset threshold value, and
      cause the notification element to operate in a second notification mode distinguishable from the first notification mode when the alternating current is supplied to the power supply resonance circuit at the second voltage level.

2. The cart power supply device according to claim 1, wherein the power supply control circuit is further configured to supply the alternating current at the second voltage level only after the detected current level has been continuously above the first preset threshold value for a predetermined period.

3. The cart power supply device according to claim 2, wherein the predetermined period is measured by repeatedly detecting the current level at intervals and counting the number of consecutive intervals for which the current level is above the first preset threshold value.

4. The cart power supply device according to claim 1, further comprising:
   a base with a power supply surface at which the first coil and notification element are disposed.

5. The cart power supply device according to claim 4, wherein the base includes a guide groove along which a wheel of the cart can travel.

6. The cart power supply device according to claim 5, wherein the base includes a stopper member positioned to stop the wheel of the cart in the guide groove.

7. The cart power supply device according to claim 4, wherein the first coil is parallel to the power supply surface of the base.

8. The cart power supply device according to claim 4, wherein the notification element comprises a plurality of light emitting diodes on the power supply surface at positions adjacent to a position of the first coil.

9. The cart power supply device according to claim 1, wherein the notification element comprises a light emitting diode.

10. The cart power supply device according to claim 1, further comprising:
    an alternating current adapter connected to the power supply control circuit and configured to provide a direct current voltage to the power supply control circuit, wherein the power supply control circuit is configured to supply the alternating current to the power supply resonance circuit by supply of a direct current to a semiconductor switch connected to the first coil via the capacitor.

11. The cart power supply device according to claim 1, further comprising:
a plurality of power supply resonance circuits each including a first coil connected to a capacitor and configured to electromagnetically couple with a second coil of a cart;
a plurality of notification elements each corresponding to a respective one of the plurality of power supply resonance circuits and configured to output a notification to a user of the cart.

12. The cart power supply device according to claim 1, wherein
the notification element comprises a plurality of light emitting diodes, and
the light emitting diodes surround a position of the first coil.

13. The cart power supply device according to claim 1, wherein the notification element is a speaker.

14. A cart charging station, comprising:
a base with a power supply surface and a pair of guide grooves configured to accept wheels of a cart;
a plurality of cart charging devices in the base, each including:
a power supply resonance circuit including a first coil connected to a capacitor, the first coil being parallel to the power supply surface and configured to electromagnetically couple with a second coil of a cart with wheels positioned in the pair of guide grooves;
a current detection circuit configured to detect a current flowing through the power supply resonance circuit;
a notification element configured to output a notification to a user of the cart; and
a power supply control circuit configured to:
supply an alternating current to the power supply resonance circuit at a first voltage level,
cause the notification element to operate in a first notification mode when the detected current flowing through the power supply resonance circuit is less than a first preset threshold value indicating the cart is incorrectly positioned relative to the first coil for charging,
supply the alternating current to the power supply resonance circuit at a second voltage level greater than the first voltage level after the detected current flowing through the power supply resonance circuit becomes greater than or equal to the first preset threshold value, and
cause the notification element to operate in a second notification mode distinguishable from the first notification mode when the alternating current is supplied to the power supply resonance circuit at the second voltage level.

15. The cart charging station according to claim 14, wherein each power supply control circuit is further configured to supply the alternating current at the second voltage level only after the detected current level has been continuously above the first preset threshold value for a predetermined period.

16. The cart charging station according to claim 15, wherein the predetermined period is measured by repeatedly detecting the current level at intervals and counting the number of consecutive intervals for which the current level is above the first preset threshold value.

17. The cart charging station according to claim 14, wherein the base includes a stopper member positioned to stop the wheels of the cart at a position where the second coil of the cart is adjacent to the first coil of one of the plurality of cart charging devices.

18. The cart charging station according to claim 14, further comprising:
an alternating current adapter connected to the plurality of cart charging devices and configured to provide a direct current voltage to the power supply control circuit of each of the plurality of cart charging devices, wherein
each respective power supply circuit is configured to supply the alternating current to the power supply resonance circuit by supply of a direct current to a semiconductor switch connected to the first coil via the capacitor.

19. The cart charging station according to claim 14, wherein each notification element comprises a plurality of light emitting diodes.

20. The cart charging station according to claim 14, wherein
each notification element comprises a plurality of light emitting diodes, and
the plurality of light emitting diodes of each notification element respectively surround a position of the first coil of one of the plurality of cart charging devices.

* * * * *